United States Patent
Takahashi

(10) Patent No.: US 6,839,863 B2
(45) Date of Patent: Jan. 4, 2005

(54) INPUT DATA PROCESSING CIRCUIT COMPRISING OF A READOUT CIRCUIT FOR SELECTING ONE OF FIRST AND SECOND FIFO BUFFERS HAVING A FASTER CLOCK

(75) Inventor: Hideaki Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 656 days.

(21) Appl. No.: 09/946,467

(22) Filed: Sep. 6, 2001

(65) Prior Publication Data

US 2002/0029356 A1 Mar. 7, 2002

(30) Foreign Application Priority Data

Sep. 6, 2000 (JP) .................................... 2000-269549

(51) Int. Cl.$^7$ ...................... G06F 5/06; G06F 13/00; H04J 3/02
(52) U.S. Cl. ...................... 713/600; 710/34; 370/538
(58) Field of Search ...................... 713/600; 710/34, 710/52, 56; 370/537, 538

(56) References Cited

U.S. PATENT DOCUMENTS

| | | | | |
|---|---|---|---|---|
| 5,619,341 A | * | 4/1997 | Auyeung et al. | ........... 358/404 |
| 5,626,785 A | * | 5/1997 | Rajnik et al. | ............... 219/541 |
| 6,185,636 B1 | * | 2/2001 | Hough | ........................ 710/34 |

FOREIGN PATENT DOCUMENTS

| | | | |
|---|---|---|---|
| JP | 61-42079 | 2/1986 | |
| JP | 02285719 A | * 11/1990 | .......... H03M/07/30 |
| JP | 06-224782 | 8/1994 | |
| JP | 10-98457 | 4/1998 | |
| JP | 10-260944 A | 9/1998 | |
| KR | 10-0191724 B1 | 7/1997 | |
| KR | 079487 A | 11/1998 | |

* cited by examiner

Primary Examiner—Thomas Lee
Assistant Examiner—Suresh K Suryawanshi
(74) Attorney, Agent, or Firm—Sughrue Mion, PLLC

(57) ABSTRACT

An input data processing circuit according to one aspect of the present invention comprises a phase detector 50 adapted to detect a clock phase difference between the first and second clocks which are sent from doubled circuits. The readout circuitry 60 selects one of the first and second FIFO buffers (10 or 30) if the clock phase difference is greater than a predetermined time corresponding to a half of data length of the frame, namely, "m" bytes of the input data sets. In this case, the selected FIFO buffer (10 or 30) has a faster clock by the clock phase difference than another clock between the first and second clocks. Then the readout circuitry 60 reads the frame out of only the selected FIFO buffer. As the results, no occurrence of "data lack" in FIFO buffers even if a clock rate difference exists between clocks generated by doubled circuits.

10 Claims, 2 Drawing Sheets

INPUT DATA PROCESSING CIRCUIT COMPRISING OF A READOUT CIRCUIT FOR SELECTING ONE OF FIRST AND SECOND FIFO BUFFERS HAVING A FASTER CLOCK

BACKGROUND OF THE INVENTION

1. Field of the Invention

The present invention relates generally to an input data processing circuit adapted to process input data sets received from doubled circuits which are asynchronous with each other.

2. Description of the Related Art

Generally, a system with high reliability comprises redundant doubled circuits, for example, a primary circuit and a redundant circuit, which have the same structure. In a system, clocks, data, enable signals are supplied from the doubled circuits of upper level to a lower level circuit.

In a design phase, clocks are determined so as to be equal in rate to each other between doubled circuits. In actual, a fabrication process however causes the clocks to have some "ppm" margin of error. That is, one of the clocks becomes slightly lower than the other clock. Therefore, it is desirable to intend to design a system where both clocks are asynchronous with or independent of each other.

To suitably receive input data sets according to the asynchronous clocks, the lower level circuit comprises an input data processing circuit at an input stage of the lower level circuit. An input data processing circuit known to the inventor comprises two FIFO (first-in first-out) buffers and a readout circuitry. The FIFO buffers correspond to the doubled circuits, and temporally store input data sets in compliance with the clocks supplied from the doubled circuits, respectively. The readout circuitry generates a common readout clock, and reads input data sets out of the FIFO buffers according to the common readout clock.

However, the fabrication error occurring between clocks of the doubled circuits might cause "data lack" in anyone of the FIFO buffers. As mentioned above, one of the clocks generated by the doubled circuits is slightly lower than the other clock, so that data storing in the FIFO buffer corresponding to the slightly lower clock is delayed in comparison with data storing in the other FIFO buffer. In addition, because the readout clock is single, the delay of data storing corresponding to the difference between both clocks accumulates, as the number of readout clocks increases. Eventually, the data lack therefore occurs in the FIFO buffer corresponding to the slightly lower clock.

As apparent from the above description, a need exists for an input data processing circuit that is tolerant to a clock rate difference between clocks generated by the doubled circuits, respectively, and that can avoid "data lack."

SUMMARY OF THE INVENTION

The present invention therefore provides an input data processing circuit that can avoid "data lack" even if a clock rate difference exists between clocks generated by doubled circuits.

An input data processing circuit according to one aspect of the present invention is for receiving input data sets from doubled circuits that comprises first and second upper circuits. The first and second upper circuits are asynchronous with each other, and generate first and second clocks, respectively.

The input data processing circuit comprises first and second FIFO buffers, first and second counters, a phase detector, and a readout circuitry. The first FIFO buffer is adapted to receive and temporally store input data sets from the first upper circuit in compliance with the first clock. The first counter is adapted to count the number of edges of the first clock, so as to generate a first completion signal and to restart the counting every time the number of edges of the first clock is equal to a predetermined number. The second FIFO buffer is adapted to receive and temporally store input data sets from the second upper circuit in compliance with the second clock. The second counter adapted to count the number of edges of the second clock, so as to generate a second completion signal and to restart the counting every time the number of edges of the second clock is equal to the predetermined number. The phase detector is adapted to detect a clock phase difference between the first and second clocks on the basis of the first and second completion signals. The readout circuitry is adapted to select one of the first and second FIFO buffers if the clock phase difference is greater than a predetermined time corresponding to a half of data length of the predetermined number of the input data sets, the selected FIFO buffer having a faster clock by the clock phase difference than another clock between the first and second clocks. Then the readout circuitry reads out of the selected FIFO buffer the predetermined number of the input data sets.

One advantage of this circuit is that it results in no occurrence of "data lack" in FIFO buffers even if a clock rate difference exists between clocks generated by doubled circuits.

A more complete understanding of the present invention, as well as further features and advantages of the present invention, will be obtained by reference to the following detailed description and drawings.

DESCRIPTION OF A PREFERRED EMBODIMENT

Figure 2:
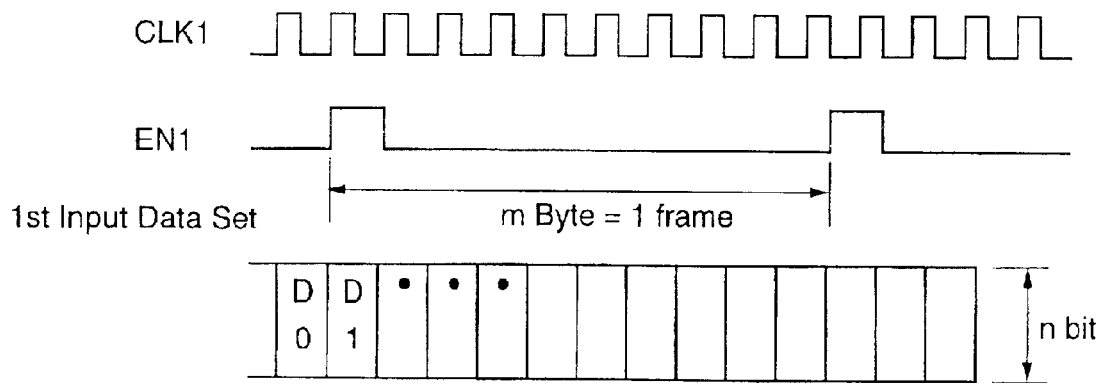
FIG. 2 is a schematic timing diagram showing data, clocks and enable signals, in accordance with the input data processing circuit illustrated in FIG. 1.
Figure 3:
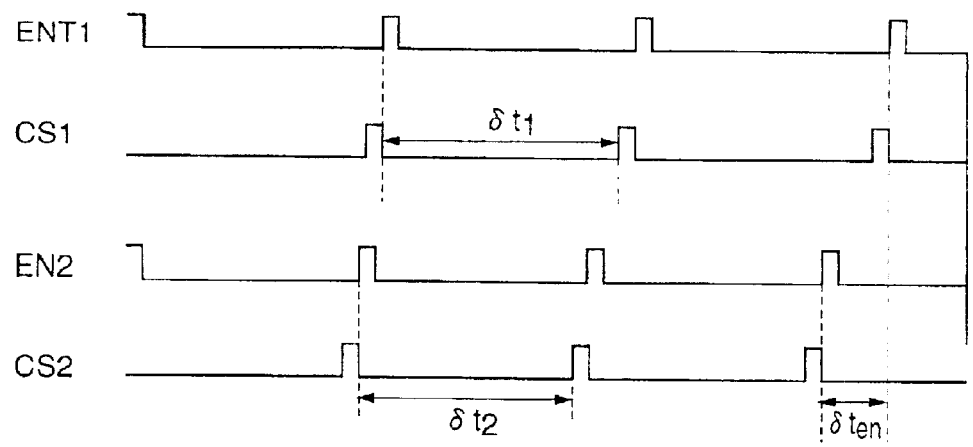
FIG. 3 is a schematic timing diagram showing determination of a clock phase difference in the input data processing circuit illustrated in FIG. 1.

An input data processing circuit according to a preferred embodiment of the present invention will now be discussed with reference to FIGS. 1 to 3.

Figure 1:
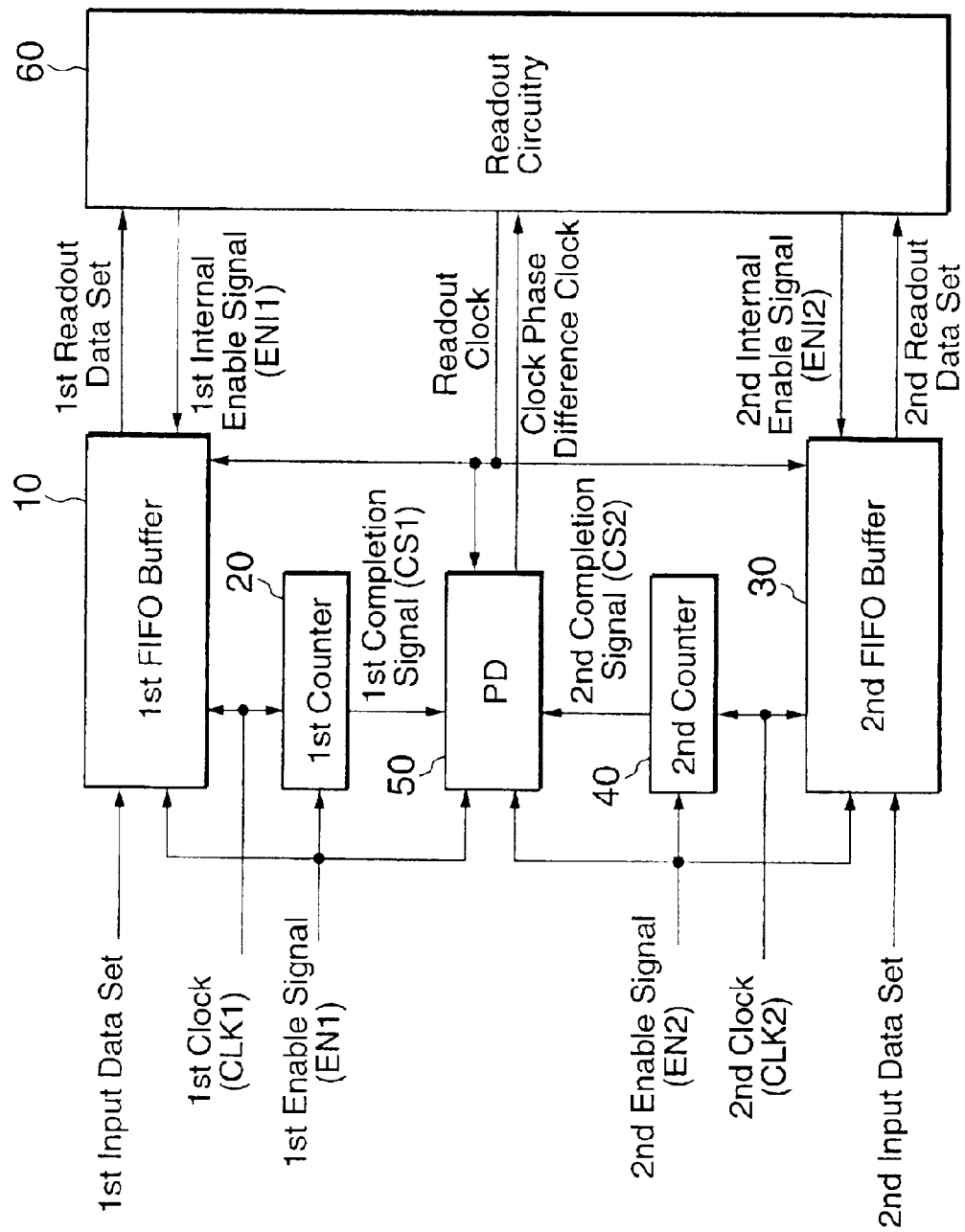
FIG. 1 is a schematic block diagram showing an input data processing circuit in accordance with an embodiment of the present invention.

With reference to FIG. 1, an input data processing circuit according to this embodiment is supplied with first and second input data sets, first and second clocks (CLK1, CLK2), and first and second enable signals (EN1, EN2) from doubled circuits that consists of first and second upper circuits, which are not shown in FIG. 1, for the sake of clarity. The first and second upper circuits have the same structure, but the first and second clocks have a clock rate difference therebetween. In this embodiment, "m" bytes of the input data sets is assumed to be "frame", and positive edges of the enable signal indicate the starting points of frames, as shown in FIG. 2. For example, "ATM cells" is known as one type of such frames.

The illustrated input data processing circuit comprises a first FIFO buffer 10, a first counter 20, a second FIFO buffer 30, a second counter 40, a phase detector 50, and a readout circuitry 60.

Into the first FIFO buffer 10, the first input data sets, the first clock (CLK1), and the first enable signal (EN1) from the first upper circuit. In this embodiment, the first FIFO buffer 10 receives the input data sets from the first upper circuits in compliance with positive edges of the first clock and positive edges of the first enable signal, and temporally stores the received data sets. The first clock and the first enable signal are also delivered into the first counter 20.

The first counter 20 serves as a notifier which notifies that the first FIFO buffer 10 stores a "frame", by using a first completion signal (CS1). In other words, since the number of the received data sets of the frame is equal to the number of positive edges of the first clock during the first FIFO buffer 10 stores a single frame, the first completion signal also indicates the number of positive edges of the first clock corresponding to a single frame. Specifically, the first counter 20 according to the present embodiment is cleared by a positive edge of the first enable signal and starts to count the number of positive edges of the first clock. Then the first counter 20 continues the counting until the first FIFO buffer 10 receives a frame, namely, m bytes of the input data sets. When the counted number of positive edges of the first clock is equal to "m" and the first FIFO buffer 10 receives a frame, the first counter 20 produces the first completion signal and delivers it into the phase detector 50.

The second FIFO buffer 30 and the second counter 40 have the same structure and configuration of the first FIFO buffer 10 and the first counter 20, as mentioned hereinafter.

Into the second FIFO buffer 30, the second input data sets, the second clock (CLK2), and the second enable signal (EN2) from the second upper circuit. In this embodiment, the second FIFO buffer 30 receives the input data sets from the second upper circuits in compliance with positive edges of the second clock and positive edges of the second enable signal, and temporally stores the received data sets. The second clock and the second enable signal are also delivered into the second counter 40.

The second counter 40 serves as a notifier which notifies that the second FIFO buffer 30 stores a "frame", by using a second completion signal (CS2). In other words, since the number of the received data sets of the frame is equal to the number of positive edges of the second clock during the second FIFO buffer 30 stores a single frame, the second completion signal also indicates the number of positive edges of the second clock corresponding to a single frame. Specifically, the second counter 40 according to the present embodiment is cleared by a positive edge of the second enable signal and starts to count the number of positive edges of the second clock. Then the second counter 40 continues the counting until the second FIFO buffer 30 receives a frame, namely, m bytes of the input data sets. When the counted number of positive edges of the second clock is equal to "m" and the second FIFO buffer 30 receives a frame, the second counter 40 produces the second completion signal and delivers it into the phase detector 50.

The phase detector 50 detects a clock phase difference between the first and second clocks on the basis of the first and second completion signals, and delivers the detected clock phase difference ($\delta t_{en}$) into the readout circuitry 60. In this embodiment, the first and second enable signals (EN1, EN2) and the first and second completion signals (CS1, CS2) are input into the phase detector 50. With reference also to FIG. 3, the phase detector 50 calculates a first time interval $\delta t_1$, that is from the positive edge of the first enable signal to the first completion signal, and accumulates, as a first accumulated time interval $\Sigma \delta t_1$, the first time intervals $\delta t_1$ over the predetermined periods. Also, the phase detector 50 calculates a second time interval $\delta t_2$, that is from the positive edge of the second enable signal to the second completion signal, and accumulates, as a second accumulated time interval $\Sigma \delta t_2$, the second time intervals $\delta t_2$ over the predetermined periods. Then the phase detector 50 calculates, as the clock phase difference $\delta t_{en}$, a difference between the first accumulated time interval $\Sigma \delta t_1$ and the second accumulated time interval $\Sigma \delta t_2$. For the above-mentioned calculations, a clock faster than both of the first and second clocks is used, which is a readout clock mentioned later in this embodiment.

The readout circuitry 60 generates a readout clock and supplies the readout clock into the first and second FIFO buffers 10 and 20. In this embodiment, the readout clock is faster in rate than the first and second clocks, and is also delivered into the phase detector 50 to be used in the above-mentioned calculations.

In addition, the readout circuitry 60 determines target FIFO buffer(s) from which data sets are read out, in response to the clock phase difference $\delta t_{en}$.

In detail, the readout circuitry 60 selects one of the first and second FIFO buffers 10, 30 if the clock phase difference $\delta t_{en}$ is greater than a predetermined time corresponding to a half of data length of the frame. In this case, the selected FIFO buffer (10 or 30) has a faster clock by the clock phase difference than another clock between the first and second clocks. The readout circuitry 60 issues a first internal enable signal (ENI1) or a second internal enable signal (ENI2), depending upon it that the selected FIFO buffer is the first FIFO buffer 10 or the second FIFO buffer 30. Thus the readout circuitry 60 reads the frame out of only the selected FIFO buffer, on the basis of the readout clock and by the use of the first internal enable signal (ENI1) or the second internal enable signal (ENI2).

On the other hand, the readout circuitry 60 selects both of the first and second FIFO buffers 10, 30 if the clock phase difference $\delta t_{en}$ is smaller than or equal to the predetermined time. In this case, the readout circuitry 60 issues the first internal enable signal (ENI1) and the second internal enable signal (ENI2) for the first and second FIFO buffers 10, 30. Thus the readout circuitry 60 reads the frame out of the first and second FIFO buffer 10, 30, on the basis of the readout clock and by the use of the first internal enable signal (ENI1) and the second internal enable signal (ENI2).

A general description of the present invention as well as a preferred embodiment of the present invention has been set forth above. Those skilled in the art to which the present invention pertains will recognize and be able to practice additional variations in the methods and system described which fall within the teachings of this invention. For example, although positive edges of the first and second clocks are counted at the first and second counter in the above-mentioned embodiment, negative edges may by counted. In this connection, the term "edge" indicates anyone of positive edge and negative edge. In addition, positive edges of the first and second enable signals are serve as triggers for counting in the above description, but negative edges may serve as the triggers. All such modifications and additions are deemed to be within the scope of the invention which is to be limited only by the claims appended hereto.

The entire disclosure of Japanese Patent Application No. 2000-269549 filed on Sep. 6, 2000 including specification, claims, drawings and summary are incorporated herein by reference in its entirety.

What is claimed is:

1. An input data processing circuit adapted to receive input data sets from first and second upper circuits that are asynchronous with each other and that generate first and second clocks, respectively, said input data processing circuit comprising:
 a first FIFO buffer adapted to receive and temporally store input data sets from the first upper circuit in compliance with the first clock;
 a first counter adapted to count the number of edges of the first clock, so as to generate a first completion signal and to restart the counting every time the number of edges of the first clock is equal to a predetermined number;
 a second FIFO buffer adapted to receive and temporally store input data sets from the second upper circuit in compliance with the second clock;
 a second counter adapted to count the number of edges of the second clock, so as to generate a second completion signal and to restart the counting every time the number of edges of the second clock is equal to the predetermined number;
 a phase detector adapted to detect a clock phase difference between the first and second clocks on the basis of the first and second completion signals; and
 a readout circuitry adapted to select one of the first and second FIFO buffers if the clock phase difference is greater than a predetermined time corresponding to a half of data length of the predetermined number of the input data sets, the selected FIFO buffer having a faster clock by the clock phase difference than another clock between the first and second clocks, so as to read out of the selected FIFO buffer the predetermined number of the input data sets.

2. An input data processing circuit as claimed in claim 1, wherein the readout circuitry reads out of both of the first and second FIFO buffers the predetermined number of the input data sets if the clock phase difference is smaller than or equal to the predetermined time.

3. An input data processing circuit as claimed in claim 1, wherein the predetermined number of the input data sets is "frame."

4. An input data processing circuit as claimed in claim 1, wherein the readout circuitry generates a readout clock to be supplied into the first and second FIFO buffers, and reads out of the selected FIFO buffer the predetermined number of the input data sets on the basis of the readout clock.

5. An input data processing circuit as claimed in claim 4, wherein the readout clock is faster in rate than the first and second clocks.

6. An input data processing circuit adapted to receive input data sets from doubled circuits consisting of first and second circuits that are asynchronous with each other and that generate first and second clocks, respectively, said input data processing circuit comprising:
 first FIFO buffer means for receiving and temporally storing input data sets from the first circuit in compliance with the first clock;
 first clock counting means for counting edges of the first clock in number, so as to generate a first completion signal and to restart the counting every time the number of edges of the first clock is equal to a predetermined number;
 second FIFO buffer means for receiving and temporally storing input data sets from the second circuit in compliance with the second clock;
 second clock counting means for counting edges of the second clock in number, so as to generate a second completion signal and to restart the counting every time the number of edges of the second clock is equal to the predetermined number;
 clock phase difference detection means for detecting a clock phase difference between the first and second clocks on the basis of the first and second completion signals; and
 data readout means for selecting one of the first and second FIFO buffer means if the clock phase difference is greater than a predetermined time corresponding to a half of data length of the predetermined number of the input data sets, the selected FIFO buffer means having a faster clock by the clock phase difference than the remaining one of the first and second clocks, so as to read out of the selected FIFO buffer means the predetermined number of the input data sets.

7. An input data processing circuit as claimed in claim 6, wherein the data readout means reads out of both of the first and second FIFO buffer means the predetermined number of the input data sets if the clock phase difference is smaller than or equal to the predetermined time.

8. An input data processing circuit as claimed in claim 6, wherein the predetermined number of the input data sets is "frame."

9. An input data processing circuit as claimed in claim 6, wherein the data readout means generates a readout clock to be supplied into the first and second FIFO buffer means, and reads out of the selected FIFO buffer means the predetermined number of the input data sets on the basis of the readout clock.

10. An input data processing circuit as claimed in claim 9, wherein the readout clock is faster in rate than the first and second clocks.

* * * * *